(12) United States Patent
Afridi et al.

(10) Patent No.: US 11,631,186 B2
(45) Date of Patent: Apr. 18, 2023

(54) NEURAL STYLE TRANSFER FOR IMAGE VARIETIZATION AND RECOGNITION (71) Applicant: 3M INNOVATIVE PROPERTIES COMPANY, St. Paul, MN (US)

(72) Inventors: Muhammad J. Afridi, Woodbury, MN (US); Elisa J. Collins, Oakdale, MN (US); Jonathan D. Gandrud, Woodbury, MN (US); James W. Howard, Circle Pines, MN (US); Arash Sangari, Frisco, TX (US); James B. Snyder, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 380 days.

(21) Appl. No.: 16/634,845

(22) PCT Filed: Jul. 25, 2018

(86) PCT No.: PCT/IB2018/055570
§ 371 (c)(1),
(2) Date: Jan. 28, 2020

(87) PCT Pub. No.: WO2019/025909
PCT Pub. Date: Feb. 7, 2019

(65) Prior Publication Data
US 2020/0219274 A1    Jul. 9, 2020

Related U.S. Application Data

(60) Provisional application No. 62/539,772, filed on Aug. 1, 2017.

(51) Int. Cl.
*G06T 7/00*     (2017.01)
*G06T 7/45*     (2017.01)
(Continued)

(52) U.S. Cl.
CPC ............ *G06T 7/45* (2017.01); *G06F 18/2155* (2023.01); *G06F 18/28* (2023.01); *G06N 3/04* (2013.01); *G06N 20/00* (2019.01)

(58) Field of Classification Search
CPC ...... G06T 7/45; G06K 9/6255; G06K 9/6259; G06K 9/6218; G06N 3/04; G06N 20/00; G06N 3/0454; G06N 3/08
See application file for complete search history.

(56) References Cited

U.S. PATENT DOCUMENTS 7,697,765 B2 *   4/2010   Matsugu   ............... G06V 10/449
                                                        706/20
2005/0185835 A1 *   8/2005   Matsugu   ............... G06V 10/449
                                                        382/159

(Continued)

FOREIGN PATENT DOCUMENTS

WO    WO 2017-021322    2/2017

OTHER PUBLICATIONS

Dmitry, "Texture Networks: Feed-Forward Synthesis of Textures and Stylized Images", 33rd International Conference on Machine Learning, 2016, vol. 48, pp. 1-16 (Year: 2016).*

(Continued)

*Primary Examiner* — Ping Y Hsieh
(74) *Attorney, Agent, or Firm* — Sriram Srinivasan; Yufeng Dong (57) ABSTRACT

Systems and methods for image recognition are provided. A style-transfer neural network is trained for each real image to obtain a trained style-transfer neural network. The texture or style features of the real images are transferred, via the trained style-transfer neural network, to a target image to generate styled images which are used for training an image-recognition machine learning model (e.g., a neural network). In some cases, the real images are clustered and representative style images are selected from the clusters.

14 Claims, 9 Drawing Sheets

(51) Int. Cl.
*G06N 20/00* (2019.01)
*G06N 3/04* (2023.01)
*G06F 18/28* (2023.01)
*G06F 18/214* (2023.01)

(56) References Cited

U.S. PATENT DOCUMENTS

2013/0156301 A1* 6/2013 Kang .................. G06K 9/6255
 382/159
2017/0083796 A1* 3/2017 Kim ....................... G06V 10/82
2017/0098152 A1* 4/2017 Kerr ......................... G06N 3/02

OTHER PUBLICATIONS

Mohammadian Amin et al: "Video-based facial expression recognition by removing the style variations", IET Image Processing, IET, UK, vol. 9, No. 7, Jul. 1, 2015 (Jul. 1, 2015), pp. 596-603.
He Zhao et al: "Synthesizing Filamentary Structured Images with GANs", arxiv.org, Cornell University Library, 201 Olin Library Cornell University Ithaca, NY 14853, Jun. 7, 2017 (Jun. 7, 2017).
Yongcheng Jing et al: "Neural Style Transfer: A Review", May 11, 2017 (May 11, 2017).
"AI Painting", Instapainting, [retrieved from the internet on Mar. 27, 2020], URL <https://www.instapainting.com/ai-painter>, 2020, pp. 1-2.
"Pikazo App—Make Anything Art", Chaos AI Art, [retrieved from the internet on Mar. 27, 2020], URL <http://www.pikazoapp.com/>, 2020, pp.
Berger, "Incorporating Long-Range Consistency in CNN-Based Texture Generation", Center for Astrophysics, 2016, pp. 1-17.
Gatys, "A Neural Algorithm of Artistic Style", Cornell University, 2015, pp. 1-16.
Gatys, "Texture Synthesis Using Convolutional Neural Networks", Cornell University, 2015, pp. 1-10.
Li, "Combining Markov Random Fields and Convolutional Neural Networks for Image Synthesis", Cornell University, 2016, pp. 1-9.
Ulyanov, "Texture Networks: Feed-Forward Synthesis of Textures and Stylized Images", 33rd International Conference on Machine Learning, 2016, vol. 48, pp. 1-16.
International Search Report for PCT International Application No. PCT/IB2018/055570, dated Nov. 22, 2018, 3 pages.

* cited by examiner

NEURAL STYLE TRANSFER FOR IMAGE VARIETIZATION AND RECOGNITION

CROSS REFERENCE TO RELATED APPLICATIONS

This application is a national stage filing under 35 U.S.C. 371 of PCT/IB2018/055570, filed Jul. 25, 2018, which claims the benefit of U.S. Application No. 62/539,772, filed Aug. 1, 2017, the disclosure of which is incorporated by reference in its/their entirety herein.

TECHNICAL FIELD

The present disclosure relates to methods and systems for image varietization via neural style transfer, which can be used to improve the performance of image-recognition systems.

BACKGROUND

Deep learning has been widely used in image recognition. For example, a classification machine learning model (e.g., a neural network) can be trained to recognize objects by feeding the model with many images. Typically, the images need to be labeled with the respective contents (e.g., objects to be recognized in the images such as, for example, a letter, a number, a sign, a symbol, a character, etc.).

SUMMARY

In a multitude of industries and applications, there is a desire to varietize the images for training an image-recognition machine learning algorithm/model (e.g., a neural network). The present disclosure provides methods and systems for image varietization via neural style transfer, which can be used to improve image recognition via an image-recognition machine learning algorithm/model.

Briefly, in one aspect, the present disclosure describes a computer-implemented method including providing to a processor, a plurality of digital images. Each digital image includes an object to be recognized, and a texture or style feature reflecting real-world conditions under which the image of the object was taken. The method further includes clustering, via the processor, the plurality of digital images into different groups according to the texture or style features of the images, each group including one or more of the digital images having similar texture or style features; selecting, via the processor, one or more representative style images from each group of images; training, via the processor, a style-transfer neural network for at least one of the representative style images to obtain a trained style-transfer neural network; transferring, via the trained style-transfer neural networks, the texture or style features from at least one of the representative images to a target image to generate styled images; and training an image-recognition machine learning model using the styled images.

In another aspect, the present disclosure describes an image-recognition system including a processor configured to receive a plurality of digital images, each digital image including an object to be recognized, and a texture or style feature reflecting real-world conditions under which the image of the object was taken; cluster the plurality of digital images into different groups according to the texture or style features of the images, each group including at least some of the digital images having similar texture or style features; select one or more representative style images from each group of images; and train a style-transfer neural network for at least one of the representative style images to obtain one or more trained style-transfer neural networks. In some embodiments, the processor can be further configured to transfer, via the trained style-transfer neural networks, the texture or style features from each representative image to a target image to generate styled images; and to train an image-recognition machine learning model using the styled images.

Various advantages are obtained in exemplary embodiments of the disclosure. One such advantage of exemplary embodiments of the present disclosure is that varietized images can be generated for an image-recognition machine learning model. The varietized images can reflect a wide range of real-world conditions under which the images of objects to be recognized were taken, which can significantly improve the performance of an image-recognition machine learning model.

Various aspects and advantages of exemplary embodiments of the disclosure have been summarized. The above Summary is not intended to describe each illustrated embodiment or every implementation of the present certain exemplary embodiments of the present disclosure. The Drawings and the Detailed Description that follow more particularly exemplify certain preferred embodiments using the principles disclosed herein.

BRIEF DESCRIPTION OF THE DRAWINGS

The disclosure may be more completely understood in consideration of the following detailed description of various embodiments of the disclosure in connection with the accompanying figures, in which:

FIG. 1' illustrates a schematic diagram of a method on how to divide a set of training examples into sub-groups, and evaluate and select the sub-groups, according to one embodiment.

In the drawings, like reference numerals indicate like elements. While the above-identified drawings, which may not be drawn to scale, set forth various embodiments of the present disclosure, other embodiments are also contemplated, as noted in the Detailed Description. In all cases, this disclosure describes the presently disclosed disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

In a multitude of industries and applications, there is a desire to varietize the images for training an image-recognition machine learning model. The present disclosure provides methods and systems for image varietization via neural style transfer, which can be used to improve image recognition via an image-recognition machine learning model. In some embodiments of the present disclosure, the varietized images can be obtained by transferring, via trained style-transfer neural networks, texture or style features from representative style images to a target image to generate styled images. The varietized images can reflect a wide range of real-world conditions under which the images of objects to be recognized were taken, which can significantly improve the performance of the image-recognition machine learning model in actual use.

In the present disclosure, the term "image-recognition machine learning model" may refer to a supervised machine learning model that can be trained by feeding training images for the application of image recognition. The machine learning models utilized herein may include, for example, a probabilistic model (e.g. a Naive Bayes model, a Bayesian network, etc.), a functional model (e.g., a neural network, a support vector network, etc.), a decision tree (e.g., a C4.5 algorithm, a random forest method, etc.), a rule learner (e.g. cAnt miner, JRip), or may belong to any other machine learning paradigm. In some embodiments, an image-recognition machine learning model may include one or more neural networks such as, for example, a classification deep convolutional neural network.

Figure 1:
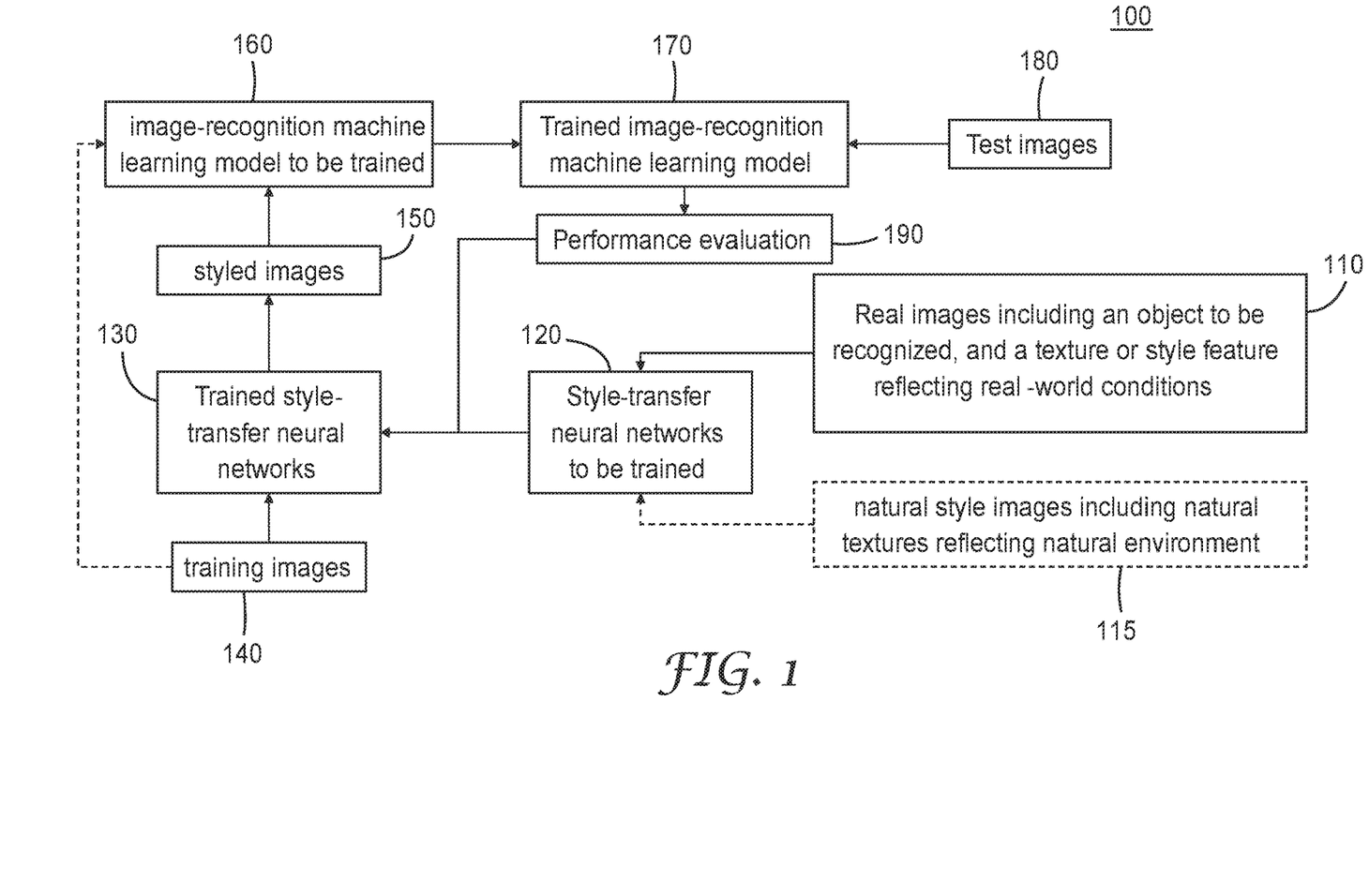
FIG. 1 is a schematic diagram of a method of image recognition, according to one embodiment.

FIG. 1 illustrates a schematic diagram of a computer-implemented method 100 for image recognition, according to one embodiment. Conventionally, training images at 140 are directly fed into an image-recognition machine learning model at 160 for training the image-recognition machine learning model to obtain a trained image-recognition machine learning model at 170. The image-recognition machine learning model may be, for example, a classification deep convolutional neural network. It is known in the art how to use deep convolution neural networks to classify images. Any suitable classification deep convolutional neural network can be used for image recognition herein.

The training images at 140 may be artificially synthesized by a computer, containing a content or an object similar to the target content or object to be recognized by the trained image-recognition machine learning model at 170. The training images can be generated by randomly combining characters, fonts, logos, etc. The generated images can be further modified by adding noise, blur, skew, blotch, etc., to mimic images captured under real-world conditions. This conventional image-recognition mechanism requires each training image being labeled with the content of the image as ground truth. When the training images are fed to the image-recognition machine learning model, an algorithm can adjust the weights between the nodes of the network to achieve increasing agreement with the ground truth to provide output. Such ground truth is required for the weight values to converge as near as possible to values optimal for correct image recognition. Also, this conventional image-recognition mechanism may require a large amount of training images (e.g., millions) to achieve reliable performance. In addition, it might be difficult to obtain a complete set of training images that are representative of the range of conditions which will be encountered during the system's use. The conventional system may not perform well on recognition cases for which it has not been trained.

In some embodiments of the present disclosure, significantly fewer training images may be needed to achieve comparable, reliable performance. The fewer training images can be first varietized to cover various real-world conditions before feeding into the image-recognition machine learning model at 160. Further, the varietized images can inherit the ground truth from the respective training images, and may not require an additional labeling step of adding the content of the image as the ground truth.

According to the method 100 of FIG. 1, real images at 110 can be fed into a style-transfer neural network at 120 for training the style-transfer neural network to obtain the trained style-transfer neural network at 130. One real image can include an object to be recognized, and a texture or style feature reflecting real-world conditions under which the image of the object was taken. The real-world conditions may be related to, for example, geographic locations, weather conditions, lighting conditions, camera angles, camera settings, distances between the object and the camera, etc. The texture or style feature of a real image may be a summary statistic of spatially invariant features of that real image. In some embodiments, a texture feature may cover the whole image so the texture feature may be the same, no matter the specific location in the image. Conversely, the content of an image may be spatially variant because different regions of the image may contain different content. The object in a real image to be recognized may include, for example, one or more of a letter, a number, a sign, a symbol, a character, etc. The real images can be obtained by any suitable optical instrument capable of recording or capturing images such as, for example, digital cameras. In some embodiments, the real images can be captured by an infrared (IR) camera system. When the images are taken for objects at real-world conditions, the resulting images can contain texture or style features associated with the real-world conditions.

The style-transfer neural network at 120 may include, for example, a convolutional neural network (CNN). The texture or style feature of a real image can be represented by a Gram matrix. By feeding the real images with the texture or style feature into the style-transfer neural network at 120, the trained style-transfer neural networks at 130 can be obtained, each of which may correspond to the respective texture or style feature.

Optionally, natural style images at 115 can be fed into a style-transfer neural network at 120 for training the respective style-transfer neural networks. The natural style images may include natural textures reflecting the natural environment such as, for example, mud, rain, glare, dust, rust, ice, scratches, water streaks, snow, etc., which are likely to be naturally encountered in the real world. The respective style-transfer neural network for each natural style image can be trained to obtain the respective trained style-transfer neural network.

The training images at 140 can be fed into the trained style-transfer neural networks at 130 to transfer texture or style features from the real images at 110 and/or the natural style images at 115 to the training images at 140 to generate styled images at 150.

In some embodiments, the real images at 110 and/or the natural style images at 115 can be designated as style images and processed through the layers of a deep convolutional neural network at 120 to generate mathematical representations of the style features of the images, which may be stored as the trained style-transfer neural networks at 130.

In some embodiments, the training images at 140 can be designated as content images and processed through the layers of the same deep convolutional neural network at 120 to generate mathematical representations of the content of the images. The mathematical representations for style and content can be combined in a certain proportion to produce a single mathematical representation of the desired output image, e.g., the styled images at 150. Computer-implemented methods for transferring a texture of a source image to objects of a target image are described in, e.g., WO 2017/021322 A1, which is incorporated herein by reference.

According the method 100 of FIG. 1, the styled images at 150 can be fed into the image-recognition machine learning model at 160 for training the image-recognition machine learning model to obtain the trained image-recognition machine learning model at 170. In some embodiments, at least some of the training images at 140 can be fed, along with the styled images at 150, into the image-recognition machine learning model at 160 for training the image-recognition machine learning model to obtain the trained image-recognition machine learning model at 170.

After obtaining the trained image-recognition machine learning model at 170, test images at 180 can be used to evaluate the performance of the trained image-recognition machine learning model at 190. Based on the results of the evaluation, the trained style-transfer neural networks with better performance can be selected. That is, in some embodiments, some of the more effective trained style-transfer neural networks can be selected to generate the styled images at 150 for training the image recognition neural network at 160.

In the present disclosure, training examples or data including one or more of the training images at 140 and the styled images at 150, can be used for training the image-recognition machine learning model at 160. For a given set of training examples or data, some training examples may be more beneficial than others for the given task of image recognition. Knowledge (representations) learned from some training examples may be redundant and least relevant. It might be helpful to focus training of the image recognition neural network at 160 on the most relevant training examples, while eliminating the redundant and irrelevant training examples from the training set. FIG. 1' illustrates a schematic diagram of method 190' on how to divide a set of training examples into sub-groups, and evaluate the sub-groups to select the more effective training examples.

In some embodiments, the training examples or data can be divided into groups based on their common characteristics. For example, in some embodiments, one such approach of grouping can be based on the styles the images are associated with; in other embodiments, a basic k-mean clustering method can be used to divide, group, or cluster the training examples into different sub-groups or sub-sets. In the embodiment illustrated in FIG. 1', a set of training examples 192 is divided into different sub-groups based on the associated styles including Style-A, Style-B, Style-C, Style-D, etc.

In some embodiments, after the set of training examples 192 is divided into sub-groups, a corresponding image-recognition machine learning model (e.g., a neural network) can be trained for each sub-group to obtain the respective trained image-recognition machine learning models (e.g., neural networks such as Net-A, Net-B, Net-C, Net-D, etc., as shown in 193 of FIG. 1'). In some embodiments, a validation set 194 (e.g., a small set of test images) can be then utilized to evaluate the performance of all the trained neural networks (e.g., Net-A, Net-B, Net-C, Net-D, etc., as shown in 193 of FIG. 1'). Given that the validation set contains a number k of images for evaluation, the output of each trained neural network can be expressed as a k×1 dimensional vector. This output can be evaluated against a k×1 vector that contains labels (ground truth, e.g., labels 195' in FIG. 1'). Considering that the training examples are divided into a number h of sub-groups, a number h of such output vectors can be generated (e.g., output vectors 195 in FIG. 1' including output vectors A, B, C, D, etc.).

In some embodiments, the output vectors resulting due to the sub-groups and the label vector (ground truth) can be provided as an input to a feature subset selection algorithm 196. The feature subset selection algorithm can be, for example, a correlation based feature selection (CFS) algorithm. The CFS algorithm can be used to determine a subset of the predicted output vectors based on two criteria: (a) vectors shall be least correlated with each other, and (b) they should be highly correlated with the actual labels. In the embodiment of FIG. 1', the output vectors A, B and D are selected. The corresponding sub-groups (e.g., Style-A, Style-B, and Style-D as shown in 192' of FIG. 1') of the selected vectors A, B and D in the subset can be utilized in the training process, while the sub-group C is considered to be redundant or less effective. That is, in some embodiments, only some of the more effective trained style-transfer neural networks can be used to generate the styled images for training the image recognition neural network.

The computer-implemented method 100 can first varietize the training images to obtain styled images, and then use the styled images to train an image-recognition machine learning model. Some training images can be varietized by transferring, via the trained style-transfer neural networks, various texture or style features from the real images and/or the natural style images, to create more variety of training images (i.e., styled images) which can cover more realistic conditions.

Figure 2:
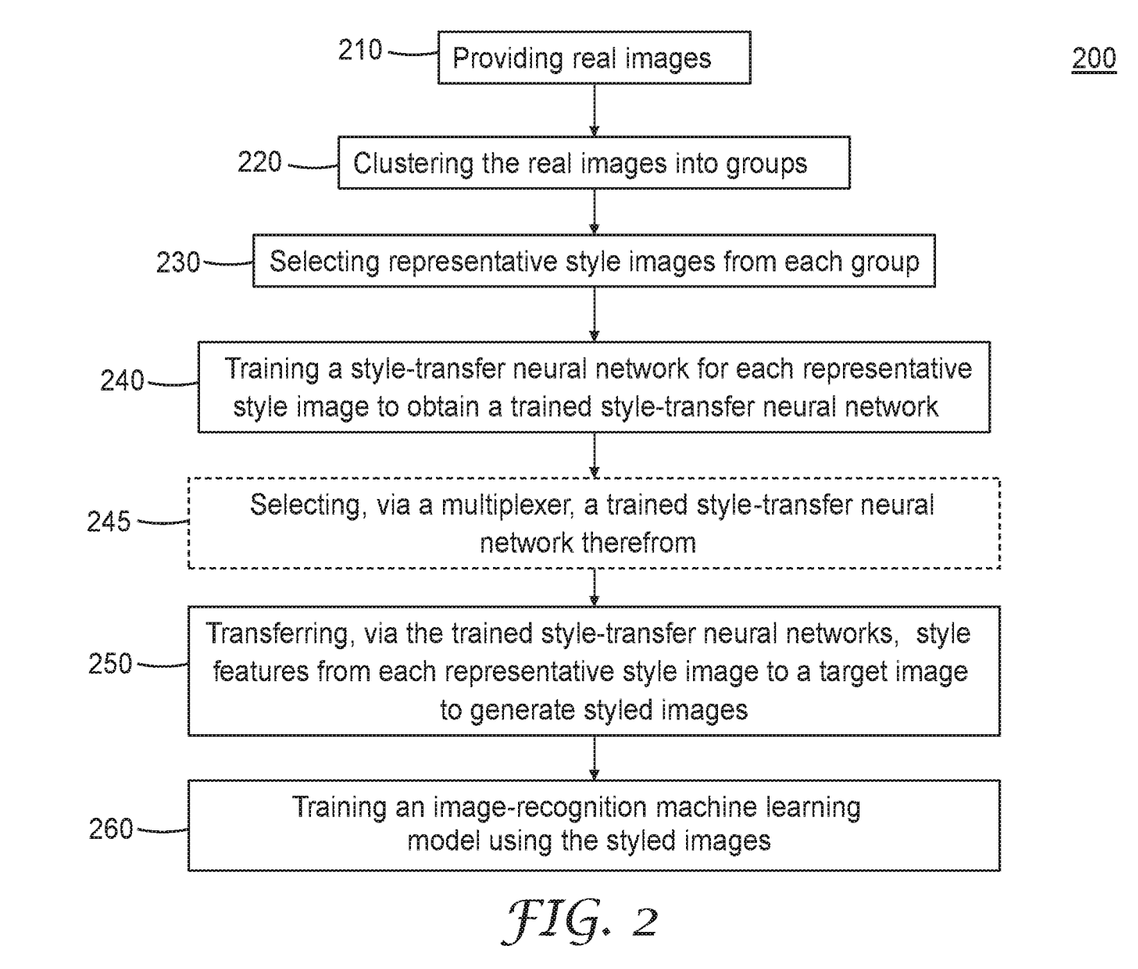
FIG. 2 is a flow diagram of a method for training an image-recognition neutral network, according to one embodiment.

FIG. 2 illustrates a flow diagram of a method 200 for training an image-recognition neutral network, according to one embodiment. At 210, a plurality of digital images can be provided to a processor. The processor can execute program instructions (e.g., software instructions) to carry out the processes or methods described herein. The digital images can include, for example, the real images at 110 of FIG. 1. The method 200 then proceeds to 220.

At 220, the digital images can be clustered, via the processor, into different groups. Each group may include one or more of the digital images having similar texture or style features. In some cases, the similar texture or style features may originate from the similar real-world conditions under which the images were taken. The method 200 then proceeds to 230.

At 230, one or more representative style images can be selected from each group. In some embodiments, the representative style images can be located at a cluster center of each group. Exemplary methods of clustering images and selecting representative style images are further illustrated in FIG. 3 and described further below. The method 200 then proceeds to 240.

At 240, for each representative style image, a style-transfer neural network can be trained to obtain the respective trained style-transfer neural network. The style-transfer neural network can be trained on how to transfer the style features of the representative style images to a target image. The outputs of training the style-transfer neural networks can be a neural network model for each style or texture feature extracted from the representative style images. In some embodiments, the outputs can be stored in, for example, a memory 714 of FIG. 7. Such pre-training of the style-transfer neural network by using the representative style images may be conducted offline, and the outputs can be stored and called to use by any real-time applications such as, for example, an image-recognition application based on a machine learning model. The method 200 then proceeds to 245 or 250.

Optionally, at 245, one or more representative style images can be selected via a multiplexer. The corresponding style or texture feature can be selected according to, for example, the sizes of the corresponding clusters, and/or a user-defined probability distribution of the style or texture features. The multiplexer can control which style or texture to be transferred (e.g., from a style image to a target image). For example, a first style or texture that represents a larger cluster can be selected, via the multiplexer, to use more often than a second style or texture that represents a smaller cluster. The method 200 then proceeds to 250.

At 250, style or texture features can be transferred, via the trained style-transfer neural network, from each representative style image to a target image to generate styled images. The target image can include one or more of the training images at 130 of FIG. 1. In some embodiments, the styled images can be generated in real time. This can be achieved by pre-training the style-transfer neural network and storing the outputs (e.g., the trained style-transfer neural networks) which can be called to generate the styled images in real time. The method 200 then proceeds to 260.

At 260, the styled images are used to train an image-recognition machine learning model such as the image-recognition machine learning model at 160 of FIG. 1.

Figure 3:
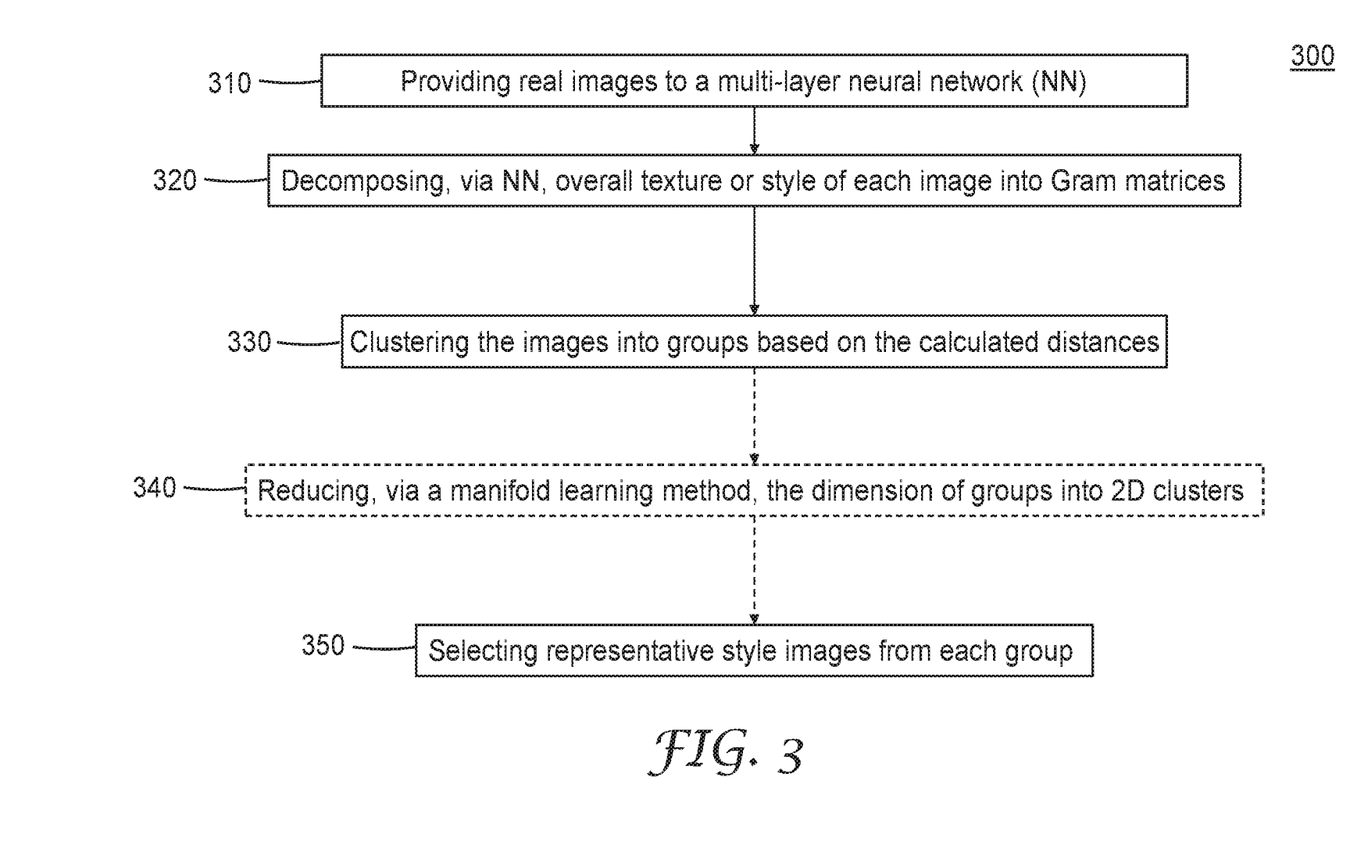
FIG. 3 illustrates a flow diagram of clustering real world images and selecting representative style images therefrom, according to one embodiment.

A process of training a style-transfer neural network using real images might be time consuming, especially when there are many real images. In some cases, some real images might be similar to each other in terms of style or texture features. The present disclosure found that a small number of real images can exemplify a variety of textures found in a large dataset of real images. FIG. 3 illustrates a flow diagram of a method 300 for clustering real images and selecting representative style images therefrom, according to one embodiment. At 310, a plurality of digital images are provided to a multi-layer neural network. The multi-layer neural network can be used to extract texture or style features from the representative style images. The multi-layer neural network may include, for example, a Visual Geometry Group (VGG) network. The method 300 then proceeds to 320.

Figure 4:
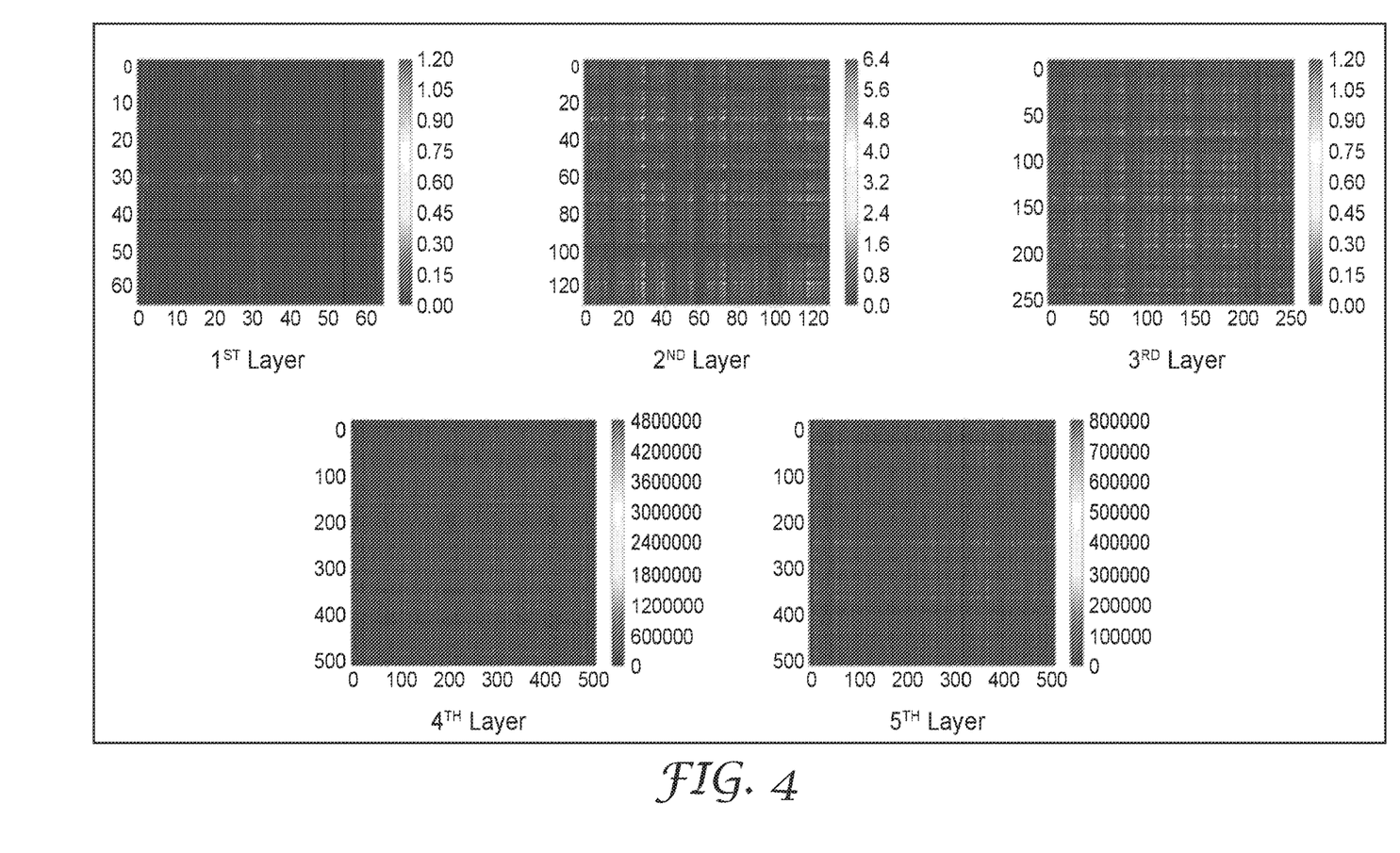
FIG. 4 illustrates exemplary Gram matrices, according to one embodiment.

At 320, the overall texture or style feature of each real image can be decomposed, via the multi-layer neural network, into Gram matrices. In some embodiments, there is one Gram matrix for each layer in the neural network (e.g., VGG network). Similarities between the images can be found within the Gram matrices at each layer. For example, in each layer of a VGG network, there can be several feature maps. The Gram matrix for each layer is the correlation matrix between the feature maps. For an exemplary 5-layer VGG network, the first layer can have 64 maps, the second layer can have 128 maps, the third layer can have 256 maps, and so on. In some embodiments, the first layer of the neural network can pick out elementary structures such as, for example, lines, which may be good enough for extracting texture or style features from the real images. FIG. 4 illustrates exemplary Gram matrices by decomposing the overall texture or style feature of a real image.

In some embodiments, a Gram matrix can be calculated as follows: $G=F^T F$, where G is a symmetric, positive semi-definite matrix. The Gram matrix for each layer can have a dimension of (number of maps×number of maps) (e.g., 64×64, 128×128, etc.). The Gram matrix may be invariant to some image spatial transformations such as shift or image cropping, but may depend on the style and/or VGG network weights, and the Gram matrix may not be invariant to the image rotation or scaling transformation. The method 300 then proceeds to 330.

At 330, the images are clustered into groups based on the Gram matrices. Similarity or dissimilarity between the style features of real images can be defined based on the Gram matrices. Such similarity or dissimilarity can be measured by the distance between different Gram matrices. In some embodiments, a centroid-based clustering method such as, for example, a K-Means or K-Means++ clustering method can be used. Other Centroid-based clustering techniques may be used, for example: k-medoids clustering, k-medians clustering, etc. Alternatives to centroid-based clustering methods may include, for example, density-based clustering (e.g. the DBSCAN method), distribution-based clustering (e.g. Gaussian mixture models), etc.

In some embodiments, the step 330 of clustering can be repeated by using different clustering methods or a combination thereof. In some embodiments, the distance between the Gram matrices can be calculated using cosine angles as a distance measure. A cosine angle can be obtained for each image. It is to be understood that the distance can be calculated using other suitable methods such as, for example, a Frobinius distance measure. The images can be clustered based on the similarity or dissimilarity between the texture or style features of the images, as encoded by the Gram matrices of features extracted in multiple layers of a deep neural network.

Figure 5:
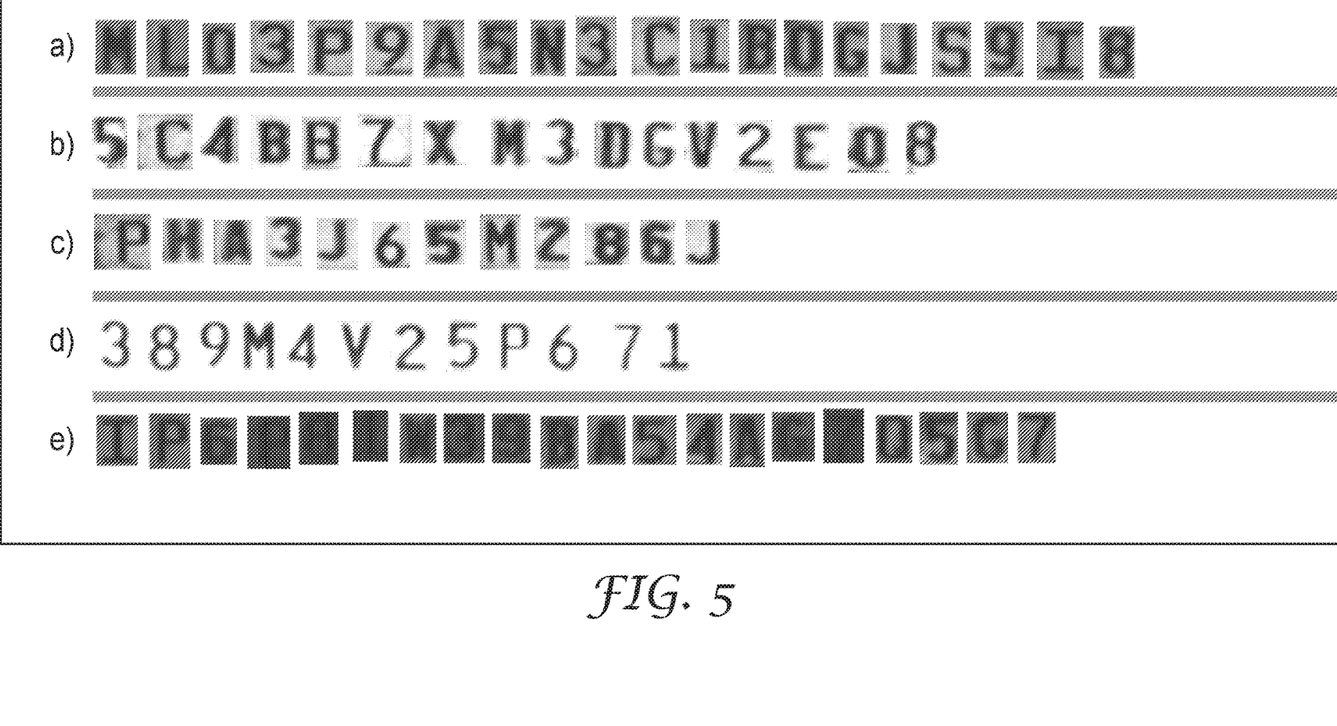
FIG. 5 illustrates exemplary five clusters of real images, according to one embodiment.

FIG. 5 illustrates exemplary real images which are clustered into five different groups a) through e) using a K-Means clustering method with k=5 and a cosine angle distance measure (e.g., using only the first layer Gram matrices from the VGG network). The set of real images in FIG. 5 are clustered into noticeably cohesive groups a) to e). The images in groups b) and d) are generally light in shade and high in contrast, whereas the images in groups a), c) and e) are generally dark in shade and low in contrast. The method 300 then proceeds to 340 or 350.

Figure 6A:
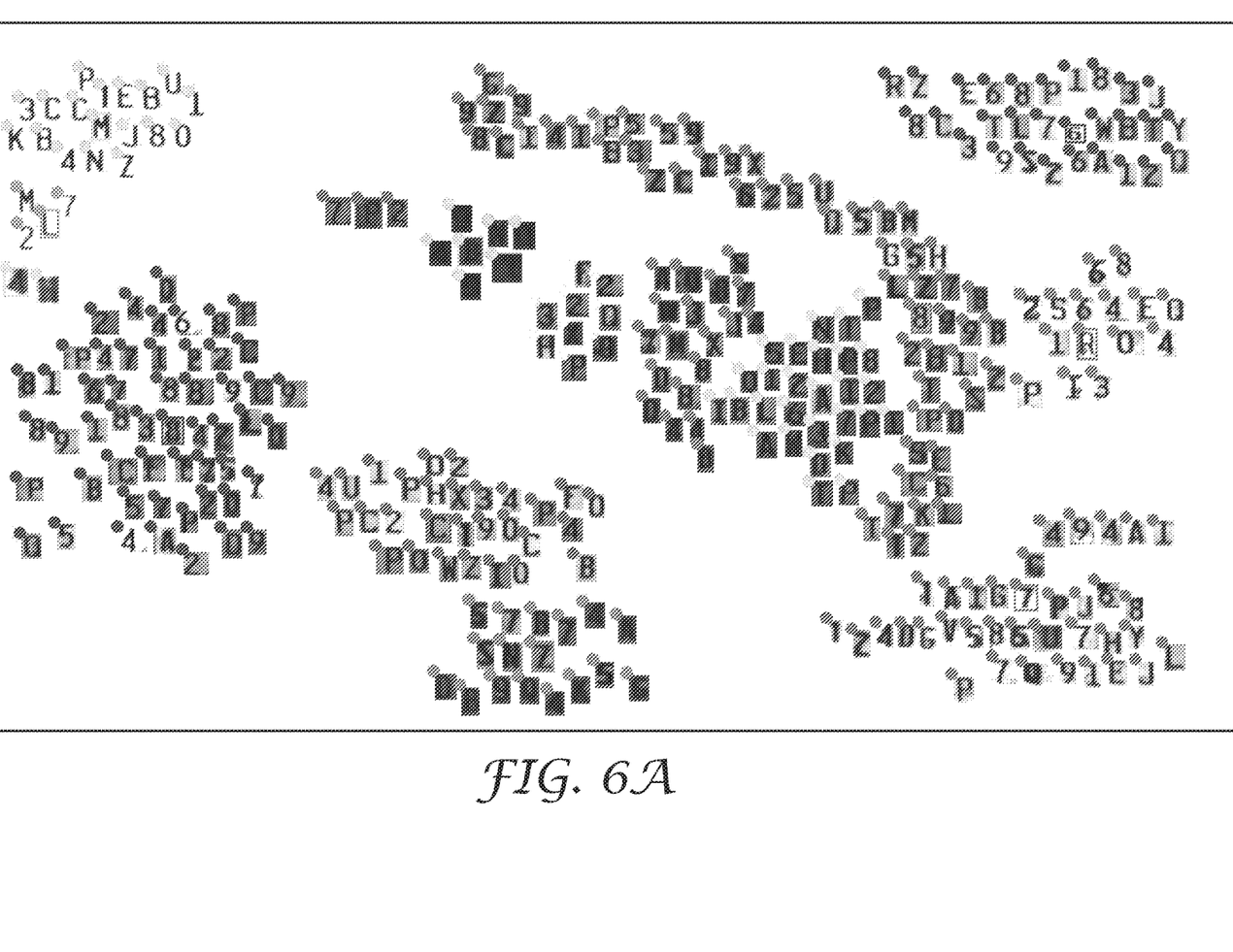
FIG. 6A illustrates exemplary 2D clusters of real images, according to one embodiment.

Optionally, at 340, the dimension of the groups can be reduced, via a manifold learning method, into 2D clusters. The variation and distribution of the real images in the groups can be visualized by dimensionality reduction techniques, e.g., manifold learning methods. By using the manifold learning methods, the groups of images can be shown in 2D clusters. In this manner, one can get a sense of the character and cohesiveness of each cluster by simply looking at the clusters of images. Suitable manifold learning methods may include, for example, an ISO-Map manifold learning method, a t-SNE manifold learning method, a MDS manifold learning method, a spectral embedding manifold learning method, a locally linear embedding manifold learning method, etc. FIG. 6A illustrates exemplary, 2D clusters of images that are visualized by a manifold learning method. As shown in FIG. 6A, many real images are projected onto a 2D plane by a t-SNE manifold learning method and grouped into 15 2D clusters. The 15 clusters are visually distinct and cohesive, as evidenced by the whitespace that separates the different clusters. The method 300 then proceeds to 350.

Figure 6B:
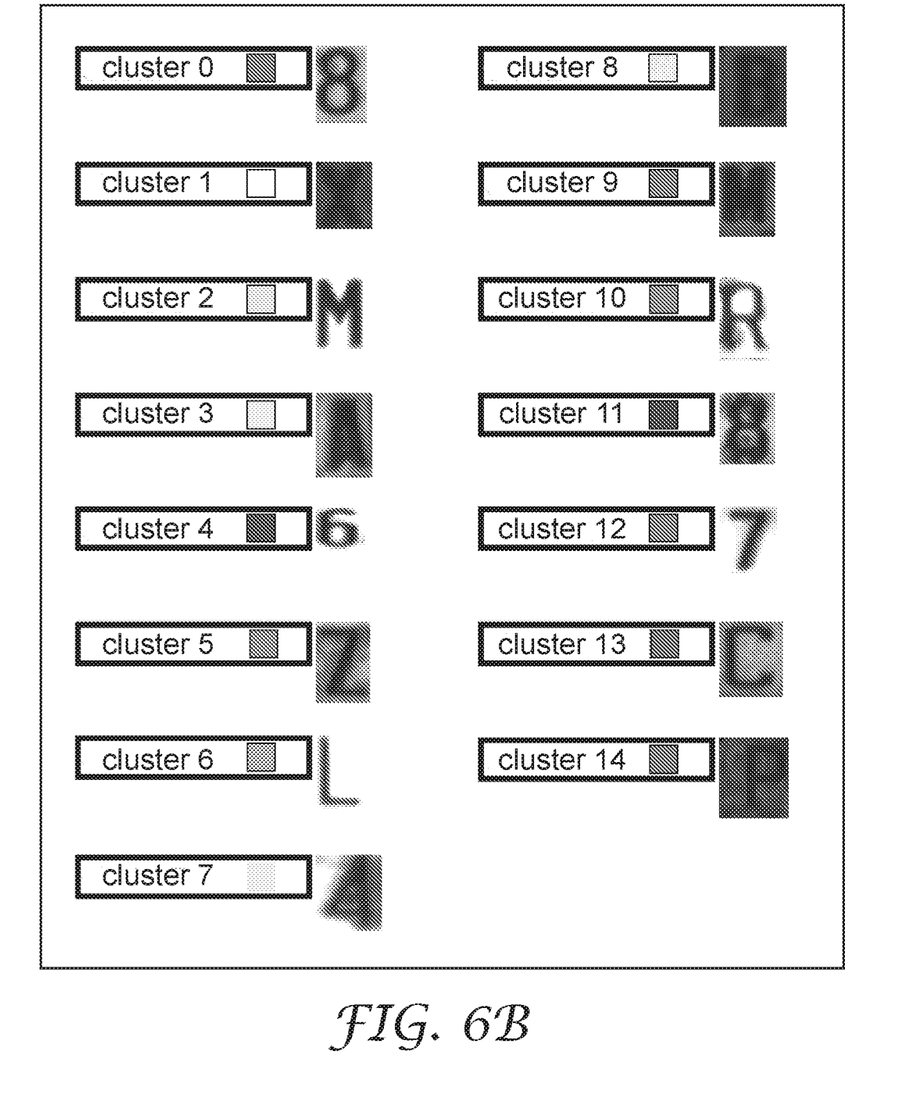
FIG. 6B illustrates representative images selected from the respective clusters of FIG. 6A.

At 350, representative style images can be selected from each group. In some embodiments, the representative style images can be located nearest to the calculated center of the respective clusters. FIG. 6B shows 14 representative style images selected from the respective 14 clusters of FIG. 6A.

The images located nearest to the respective cluster center are selected as the representative style images.

Figure 7:
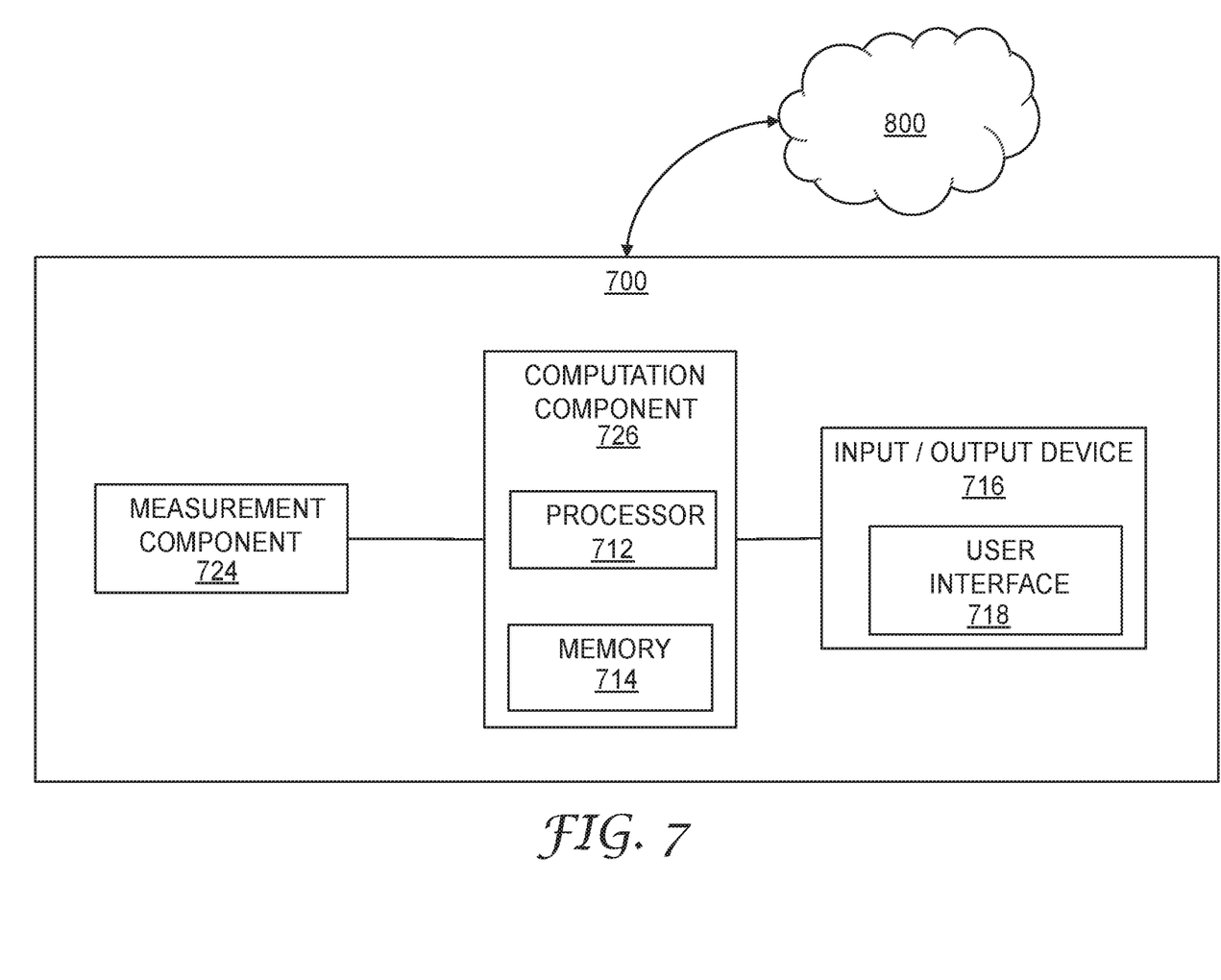
FIG. 7 illustrates an image-recognition system, according to one embodiment.

FIG. 7 illustrates an image-recognition system 700 for image recognition by implementing any one of the computer-implemented methods described herein such as, for example, one or more of the methods 100, 200, and 300, according to some embodiments. The system 700 includes a measurement component 724, a computation component 726, and one or more input/output devices 716.

The measurement component 724 is configured to capture one or more real images for objects to be recognized. The measurement component 724 can be various cameras to capture images. In some embodiments, the measurement component 724 can include, for example, a digital camera of a mobile phone, an IR camera, etc.

In the embodiment of FIG. 7, the computation component 726 includes a processor 712 and a memory 714. The computation component 726 is functionally connected to the measurement component 924 (e.g., a digital camera), and receives signals related to the captured images from the measurement component 724. The processor 712 can then process the digital images, via running a computer program in any suitable programming language (e.g., Python), by implementing one or more of the methods 100, 200 and 300 to obtain trained style-transfer neural networks, according to some embodiments.

The trained style-transfer neural networks can be stored in the memory 714. In some embodiments, the memory 714 may have a data file to store outputs of training style-transfer neural networks, and image-related data including, for example, all the captured real images and metadata of the images.

With the trained style-transfer neural networks, the processor 712 can further transfer, via the training style-transfer neural networks, style features from each representative style image to a target image to generate styled images, according to some embodiments. The styled images can be used for training an image-recognition machine learning model to obtain a trained image-recognition machine learning model.

In some embodiments, when an object (a letter, a number, a sign, a symbol, or a character or the combination thereof on a carrier surface) is to be recognized, one or more images of the object can be measured by the measurement component 724 (e.g., a digital camera). The computation component 726 can receive signals related to the images for the object from the measurement component 724 and process the signals. The processor 712 can feed the image into the trained image-recognition machine learning model for image recognition.

In some embodiments, the measurement component 724 may be a digital camera of a mobile device (e.g., a mobile phone) that can work in the field. The measurement component 724 can wirelessly communicate with a remote computing device such as, for example, the computation component 726 by sending and receiving signals. The computation component 726 may be integrated with, for example, a computer, a server, a mobile phone, etc. The computation component 726 can call the trained image-recognition machine learning model to run on the data from the measurement component 724, and send the recognition information to the input/output device 716 to display thereon.

The memory 714 stores information. In some embodiments, the memory 714 can store instructions for performing the methods or processes described herein. In some embodiments, computer-vision feature data, the untrained image-recognition machine learning model data, and the trained image-recognition machine learning model data can be pre-stored in the memory 714.

The memory 714 may include any volatile or non-volatile storage elements. Examples may include random access memory (RAM) such as synchronous dynamic random access memory (SDRAM), read-only memory (ROM), non-volatile random access memory (NVRAM), electrically erasable programmable read-only memory (EEPROM), and FLASH memory.

Examples may also include hard-disk, magnetic tape, a magnetic or optical data storage media, a compact disk (CD), a digital versatile disk (DVD), a Blu-ray disk, and a holographic data storage medium.

The processor 712 may include, for example, one or more general-purpose microprocessors, specially designed processors, application specific integrated circuits (ASIC), field programmable gate arrays (FPGA), a collection of discrete logic, and/or any type of processing device capable of executing the techniques described herein. In some embodiments, the processor 712 (or any other processors described herein) may be described as a computing device.

In some embodiments, the memory 714 may be configured to store program instructions (e.g., software instructions) that are executed by the processor 712 to carry out the processes or methods described herein. In other embodiments, the processes or methods described herein may be executed by specifically programmed circuitry of the processor 712. In some embodiments, the processor 712 may thus be configured to execute the techniques for image varietization and image recognition described herein. The processor 712 (or any other processors described herein) may include one or more processors.

Input/output device 716 may include one or more devices configured to input or output information from or to a user or other device. In some embodiments, the input/output device 716 may present a graphical user interface (GUI) 718 where a user may control the processes for image varietization and image recognition. For example, the GUI 718 may include a display screen for presenting visual information to a user. In some embodiments, the display screen includes a touch sensitive display. In some embodiments, the GUI 718 may include one or more different types of devices for presenting information to a user. The GUI 718 may include, for example, any number of visual (e.g., display devices, lights, etc.), audible (e.g., one or more speakers), and/or tactile (e.g., keyboards, touch screens, or mice) feedback devices. In some embodiments, the input/output devices 716 may represent one or more of a display screen (e.g., a liquid crystal display or light emitting diode display) and/or a printer (e.g., a printing device or component for outputting instructions to a printing device). In some embodiments, the input/output device 716 may be configured to accept or receive program instructions (e.g., software instructions) that are executed by the processor 712 to carry out the embodiments described herein.

The system 700 may also include other components and the functions of any of the illustrated components including the processor 712, the memory 714, and the input/output devices 716 may be distributed across multiple components and separate devices such as, for example, computers. The system 700 may be configured as a workstation, desktop computing device, notebook computer, tablet computer, mobile computing device, or any other suitable computing device or collection of computing devices. The system 700 may operate on or be collected to a local network or be hosted in a Cloud computing environment 800. The illustrated components of FIG. 7 are shown merely to explain various aspects of the present disclosure and the addition or removal of components would be apparent to one of skill in the art.

LISTING OF EXEMPLARY EMBODIMENTS

Exemplary embodiments are listed below. It is to be understood that any of embodiments 1-27 and 28-35 can be combined.

Embodiment 1 is a computer-implemented method comprising:
  providing to a processor, a plurality of digital images, each digital image including an object to be recognized, and a texture or style feature reflecting real-world conditions under which the image of the object was taken;
  clustering, via the processor, the plurality of digital images into different groups according to the texture or style features of the images, each group including one or more of the digital images having similar texture or style features;
  selecting, via the processor, one or more representative style images from each group of images;
  training, via the processor, a style-transfer neural network for at least one of the representative style images to obtain one or more trained style-transfer neural networks;
  transferring, via the trained style-transfer neural networks, the texture or style features from each representative image to a target image to generate styled images; and
  training an image-recognition machine learning model using the styled images.

Embodiment 2 is the method of embodiment 1, wherein the style-transfer neural networks are pre-trained, and the trained style-transfer neural networks are stored for calling to use.

Embodiment 3 is the method of embodiment 2, wherein at least one of the stored style-transfer neural networks is called to use by a real-time application.

Embodiment 4 is the method of any one of embodiments 1-3, wherein the trained style-transfer neural networks each correspond to a representative texture or style feature.

Embodiment 5 is the method of any one of embodiments 1-4, further comprising selecting one trained style-transfer neural network based on a statistic of the corresponding group of digital images.

Embodiment 6 is the method of embodiment 5, further comprising choosing, via a multiplexer, one trained style-transfer neural network from the trained style-transfer neural networks according to the size of the groups.

Embodiment 7 is the method of embodiment 5 or 6, further comprising choosing, via a multiplexer, one trained style-transfer neural network from the trained style-transfer neural networks according to a predetermined probability distribution of the images.

Embodiment 8 is the method of any one of embodiments 1-7, wherein clustering the plurality of digital images comprises inputting the digital images to a multi-layer neural network.

Embodiment 9 is the method of embodiment 8, further comprising decomposing, via the multi-layer neural network, the texture or style feature of each image into Gram matrices.

Embodiment 10 is the method of embodiment 8 or 9, wherein the multi-layer neural network includes a Visual Geometry Group (VGG) network.

Embodiment 11 is the method of embodiment 9 or 10, wherein each Gram matrix corresponds to one layer of the multi-layer neural network, and represents a correlation matrix between feature maps of each image in each layer.

Embodiment 12 is the method of any one of embodiments 9-11, wherein the images are clustered into the groups based on similarities found, via a K-means clustering method, within the gram matrices.

Embodiment 13 is the method of any one of embodiments 1-12, further comprising calculating distances between the Gram matrices.

Embodiment 14 is the method of embodiment 13, wherein the distances are calculated using cosine angle as a distance measure.

Embodiment 15 is the method of any one of embodiments 1-14 wherein selecting the representative style image comprises selecting the image at a cluster center of each group.

Embodiment 16 is the method of any one of embodiments 1-15, further comprising reducing, via a manifold learning method, the dimension of groups into 2D clusters.

Embodiment 17 is the method of embodiment 16, further comprising visualizing the 2D clusters of images.

Embodiment 18 is the method of any one of embodiments 1-17, further comprising providing one or more natural style images including natural textures reflecting the natural environment, and training the style-transfer neural network for each natural style image to obtain the respective trained style-transfer neural network.

Embodiment 19 is the method of any one of embodiments 1-18, further comprising evaluating the performance of the image-recognition machine learning model.

Embodiment 20 is the method of embodiment 19, further comprising selecting the trained style-transfer neural networks based on the evaluation.

Embodiment 21 is the method of any one of embodiments 18-20, wherein the natural environment includes mud, rain, glare, dust, rust, ice, scratches, water streaks, or snow.

Embodiment 22 is the method of any one of embodiments 1-21, wherein the object to be recognized includes one or more of a letter, a number, a sign, a symbol, and a character.

Embodiment 23 is the method of any one of embodiments 1-22, further comprising evaluating the training of the image-recognition machine learning model.

Embodiment 24 is the method of embodiment 23, further comprising dividing the styled images into sub-groups.

Embodiment 25 is the method of embodiment 24, further comprising training the image-recognition machine learning model for each sub-group by using a validation set.

Embodiment 26 is the method of embodiment 25, further comprising selecting one or more representative sub-groups from the sub-groups based on a feature selection algorithm.

Embodiment 27 is the method of any one of embodiments 1-25, wherein the image-recognition machine learning model includes one or more image-recognition neural networks.

Embodiment 28 is an image-recognition system comprising:
  a processor configured to
    receive a plurality of digital images, each digital image including an object to be recognized, and a texture or style feature reflecting real-world conditions under which the image of the object was taken;
    cluster the plurality of digital images into different groups according to the texture or style features of the images, each group including one or more of the digital images having similar texture or style features;
    select one or more representative style images from each group of images; and train a style-transfer neural network for at least one of the representative style images to obtain one or more trained style-transfer neural networks.

Embodiment 29 is the system of embodiment 28 further comprising a memory to store the trained style-transfer neural networks.

Embodiment 30 is the system of embodiment 28 or 29, wherein the trained style-transfer neural networks are stored in a Cloud-computing environment.

Embodiment 31 is the system of any one of embodiments 28-30, wherein at least one of the stored style-transfer neural networks is called to use by a real-time application.

Embodiment 32 is the system of any one of embodiments 28-31, wherein the style-transfer neural networks are pre-trained by the processor, and the trained style-transfer neural networks are stored in a memory for calling to use.

Embodiment 33 is the system of any one of embodiments 28-32, wherein the processor is further configured to transfer, via the trained style-transfer neural networks, the texture or style features from each representative image to a target image to generate styled images.

Embodiment 34 is the system of any one of embodiments 28-33, wherein the processor is further configured to train an image-recognition machine learning model using the styled images.

Embodiment 35 is the system of embodiment 34, wherein the image-recognition machine learning model includes one or more image-recognition neural networks.

Exemplary embodiments of the present disclosure may take on various modifications and alterations without departing from the spirit and scope of the disclosure. Accordingly, it is to be understood that the embodiments of the present disclosure are not to be limited to the described exemplary embodiments, but are to be controlled by the limitations set forth in the claims and any equivalents thereof.

Reference throughout this specification to "one embodiment," "certain embodiments," "one or more embodiments," or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of phrases such as "in one or more embodiments," "in certain embodiments," "in one embodiment," or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. In particular, as used herein, the recitation of numerical ranges by endpoints is intended to include all numbers subsumed within that range (e.g., 1 to 5 includes 1, 1.5, 2, 2.75, 3, 3.80, 4, and 5). In addition, all numbers used herein are assumed to be modified by the term "about." Furthermore, various exemplary embodiments have been described. These and other embodiments are within the scope of the following claims.

What is claimed is:

1. A computer-implemented method comprising:
obtaining, by a processor, a plurality of digital images, each respective digital image of the plurality of digital images including a representation of an object to be recognized, and a texture or style feature reflecting real-world conditions under which the image of the object was taken;
inputting, by the processor, one or more of the digital images of the plurality of digital images to a multi-layer neural network;
executing, by the processor, the multi-layer neural network, to decompose the texture or style feature of each of the one or more of the digital images into respective Gram matrices;
clustering, by the processor, the plurality of digital images into different groups according to, distances between the respective Gram matrices such that each group includes one or more of the digital images having similar texture or style features;
selecting, by the processor, one or more representative style images from each respective group of images;
training, by the processor, a style-transfer neural network for at least one of the representative style images to obtain one or more trained style-transfer neural networks;
transferring, by the processor, using the one or more trained style-transfer neural networks, the respective texture or style features from each representative image to respective target images to generate styled images; and
training an image-recognition machine learning model using the styled images.

2. The method of claim 1, wherein each respective trained style-transfer neural network of the one or more trained style-transfer neural networks corresponds to a respective representative texture or style feature.

3. The method of claim 1, further comprising selecting one trained style-transfer neural network based on a statistic describing the respective corresponding group of digital images.

4. The method of claim 3, further comprising selecting, via a multiplexer, the one trained style-transfer neural network from the trained style-transfer neural networks according to a size of the respective corresponding group of digital images.

5. The method of claim 3, further comprising choosing, via a multiplexer, one trained style-transfer neural network from the trained style-transfer neural networks according to a predetermined probability distribution of the respective corresponding group of digital images.

6. The method of claim 1, wherein the multi-layer neural network includes a Visual Geometry Group (VGG) network.

7. The method of claim 1, wherein selecting the representative style image comprises selecting, by the processor, the representative style image based on a determination that each representative style image is at a cluster center of each respective group.

8. The method of claim 1, further comprising reducing, via a manifold learning method, a dimension of each of the groups into respective 2D clusters.

9. The method of claim 8, further comprising visualizing, by the processor, the 2D clusters of images.

10. The method of claim 1, wherein the object to be recognized includes one or more of a letter, a number, a sign, a symbol, or a character.

11. The method of claim 1, further comprising evaluating, by the processor, the training of the image-recognition machine learning model.

12. An image-recognition system comprising:
a memory configured to store a plurality of digital images, each respective digital image of the plurality of digital images including a representation of an object to be recognized, and a texture or style feature reflecting real-world conditions under which the image of the object was taken; and
a processor communicatively coupled to the memory, the processor being configured to:
input one or more of the digital images of the plurality of digital images to a multi-layer neural network;
execute the multi-layer neural network, to decompose the texture or style feature of each of the one or more of the digital images into respective Gram matrices;
cluster the plurality of digital images into different groups according to, distances between the respective Gram matrices such that each group includes at least some of the digital images having similar texture or style features;
select one or more representative style images from each group of images; and
train a style-transfer neural network for at least one of the representative style images to obtain one or more trained style-transfer neural networks;
transfer, using the one or more trained style-transfer neural networks, the respective texture or style features from each representative image to respective target images to generate styled images; and
train an image-recognition machine learning model using the styled images.

13. The image-recognition system of claim 12, wherein each respective trained style-transfer neural network of the one or more trained style-transfer neural networks corresponds to a respective representative texture or style feature.

14. The image-recognition system of claim 12, wherein the processor is further configured to select one trained style-transfer neural network based on a statistic describing the respective corresponding group of digital images.

* * * * *

UNITED STATES PATENT AND TRADEMARK OFFICE
CERTIFICATE OF CORRECTION

| | |
|---|---|
| PATENT NO. | : 11,631,186 B2 |
| APPLICATION NO. | : 16/634845 |
| DATED | : April 18, 2023 |
| INVENTOR(S) | : Muhammad Jamal Afridi et al. |

It is certified that error appears in the above-identified patent and that said Letters Patent is hereby corrected as shown below:

In the Claims

Column 14
Line 18 (approx.), In Claim 1, delete "different groups according to, distances between" and insert
-- different groups according to distances between --, therefor.

Column 15
Line 18 (approx.), In Claim 12, delete "different groups according to, distances between" and insert
-- different groups according to distances between --, therefor.

Signed and Sealed this
Twentieth Day of August, 2024

Katherine Kelly Vidal
*Director of the United States Patent and Trademark Office*